United States Patent [19]
Brown

[11] Patent Number: 5,530,636
[45] Date of Patent: Jun. 25, 1996

[54] AUTOMATIC FEEDBACK SYSTEM FOR A DUAL OUTPUT POWER SUPPLY

[75] Inventor: Alan E. Brown, Georgetown, Tex.

[73] Assignee: Dell USA, L.P., Austin, Tex.

[21] Appl. No.: 372,414

[22] Filed: Jan. 13, 1995

[51] Int. Cl.⁶ .......................... H02M 3/24; H02M 3/335
[52] U.S. Cl. ............................................... 363/97; 363/21
[58] Field of Search .................. 363/16, 20, 21, 363/63, 95, 97, 131

[56] References Cited

U.S. PATENT DOCUMENTS

| | | | |
|---|---|---|---|
| 4,870,553 | 9/1989 | Brown | 363/16 |
| 4,922,399 | 5/1990 | Tsuzuki | 363/21 |
| 5,285,367 | 2/1994 | Keller | 363/21 |
| 5,313,381 | 5/1994 | Balakrishnan | 363/147 |
| 5,394,017 | 2/1995 | Catano et al. | 363/21 |
| 5,408,402 | 4/1995 | Nonnenmacher | 363/97 |

*Primary Examiner*—Matthew V. Nguyen
*Attorney, Agent, or Firm*—Henry N. Garrana; Mark P. Kahler; Michelle M. Turner

[57] ABSTRACT

A feedback system coupled between both outputs of a dual flyback converter for detecting which output is loaded and for switching between one of two feedback circuits for regulating the voltage of the loaded output. The detection circuit includes a balanced voltage divider coupled in series between the two opposite polarity outputs. The voltage divider preferably comprises balanced high impedance resistors to prevent substantial loading. The voltage of the junction between the two resistors shifts away from the loaded output because of an increase of the voltage level of the unloaded output caused by leakage inductance of the switching transformer. The detection circuit also includes a comparator, which detects the voltage shift and asserts its output to a switch circuit, which switches control between the two feedback circuits to control the loop and appropriately regulate the loaded output voltage. The switch circuit is preferably an analog switch including one or more field-effect transistors.

20 Claims, 2 Drawing Sheets

5,530,636

AUTOMATIC FEEDBACK SYSTEM FOR A DUAL OUTPUT POWER SUPPLY

FIELD OF THE INVENTION

The present invention relates to power supplies, and more particularly to a dual output power supply having an automatic feedback path for detecting which output is coupled to a load and for regulating that output.

BACKGROUND OF THE PRESENT INVENTION

There are a variety of flat panel display vendors and thus different types of displays for laptop and notebook computer systems. Some displays require a positive operating voltage while others require a negative operating voltage. As far as is known, no vendors require both positive and negative voltages. Many manufacturers design laptop and/or notebook computers with dual output power supplies providing both a positive and a negative voltage so that either a positive or a negative flat panel display may be used. Several problems exist with such dual output power supplies. A dual output capability increases the cost of the computer, and also increases the difficulty of maintaining tight and predictable load regulation of the output voltage polarity being used.

Some manufacturers of laptop and notebook computers provide two separate power converters each having a separate feedback path. Obviously, two separate power converters is relatively expensive considering that only one is used. Another solution is a single power converter with an inherently tight output low regulation figure of merit. A forward converter is typically used in the single power converter configuration using a coupled inductor output stage, since forward converters are inherently easier to regulate. However, forward converters are relatively sophisticated and thus expensive to design and manufacture. A less expensive flyback converter could be used with a complex dual input feedback path which sums both the polarity outputs. This particular flyback solution, however, is less than optimal since the desired load regulation figure of merit is very difficult to achieve.

It is desired, therefore, to provide a relatively inexpensive power supply having both a positive and negative operating voltage to supply power to either a positive or negative flat panel display. The power supply should maintain the optimal load regulation figure of merit regardless of which output is loaded.

SUMMARY OF THE PRESENT INVENTION

A dual output power converter according to the present invention includes a single converter having a dual polarity output and a detection circuit for detecting which of the two outputs is coupled to a load. The converter further includes a switch circuit coupled to the detection circuit for switching control between two separate feedback circuits to the error amplifier input. The use of the switch circuit for switching control between two separate feedback paths allows the use of a relatively inexpensive flyback converter with dual outputs. The detection circuit takes advantage of leakage inductance inherent in any power transformer, where such leakage inductance tends to cause an imbalance between the regulated and unregulated outputs. A comparator circuit detects the imbalance and switches the feedback path accordingly.

The flyback converter includes a pulse width modulation (PWM) control circuit for controlling a power switch to switch current through the primary inductor of a transformer. The transformer includes two secondary inductors coupled to corresponding diodes positioned to implement a flyback topology. The first secondary inductor develops a positive voltage and the other develops an opposite, negative voltage having approximately the same amplitude. In this manner, a flat panel display may be connected to either the positive or negative output voltage for receiving power.

A feedback system according to the present invention includes a balanced, high impedance voltage divider coupled between the positive and negative outputs of the converter. Preferably, the voltage divider comprises two matched, high impedance resistors coupled in series between the outputs. The parasitic or leakage inductance of the transformer tends to transfer energy to both output polarities, which causes a higher voltage magnitude of the output not being regulated. In this manner, the voltage at the junction of the balanced voltage divider shifts towards the unloaded output. A comparator referenced to a common voltage level, such as ground, is coupled to the voltage divider junction and detects the voltage shift. The comparator asserts its output to indicate which of the dual outputs is connected to a load. The output of the comparator is provided to an analog switch for switching control of the loop between two separate feedback paths coupled to the positive and negative outputs, respectively. Thus, the loaded output is regulated.

In the preferred embodiment, the analog switch comprises a bilateral single pole, single throw analog switch which is preferably implemented with two field-effect transistors FETs) connected in series. In the preferred embodiment, a feedback circuit associated with the positive input comprises a resistor divider using relatively high value resistors connected directly to the error amplifier input of the PWM. A feedback circuit associated with the negative supply preferably comprises an inverting voltage divider having a very low relative impedance. The inverting voltage divider preferably includes an inverting amplifier and resistors coupled to divide the negative output voltage, as desired. The low impedance of the negative feedback circuit dominates over the resistor divider of the positive feedback circuit when the analog switch electrically connects the negative feedback circuit.

In this manner, the feedback circuit associated with and connected to the positive supply is used if the positive output supply is loaded, and the feedback circuit associated with and connected to the negative supply is used if the negative output supply is loaded. This allows a relatively inexpensive flyback converter to be used as a dual output power supply to provide power to either a positive or negative load, such as either a positive or negative polarity flat panel display.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
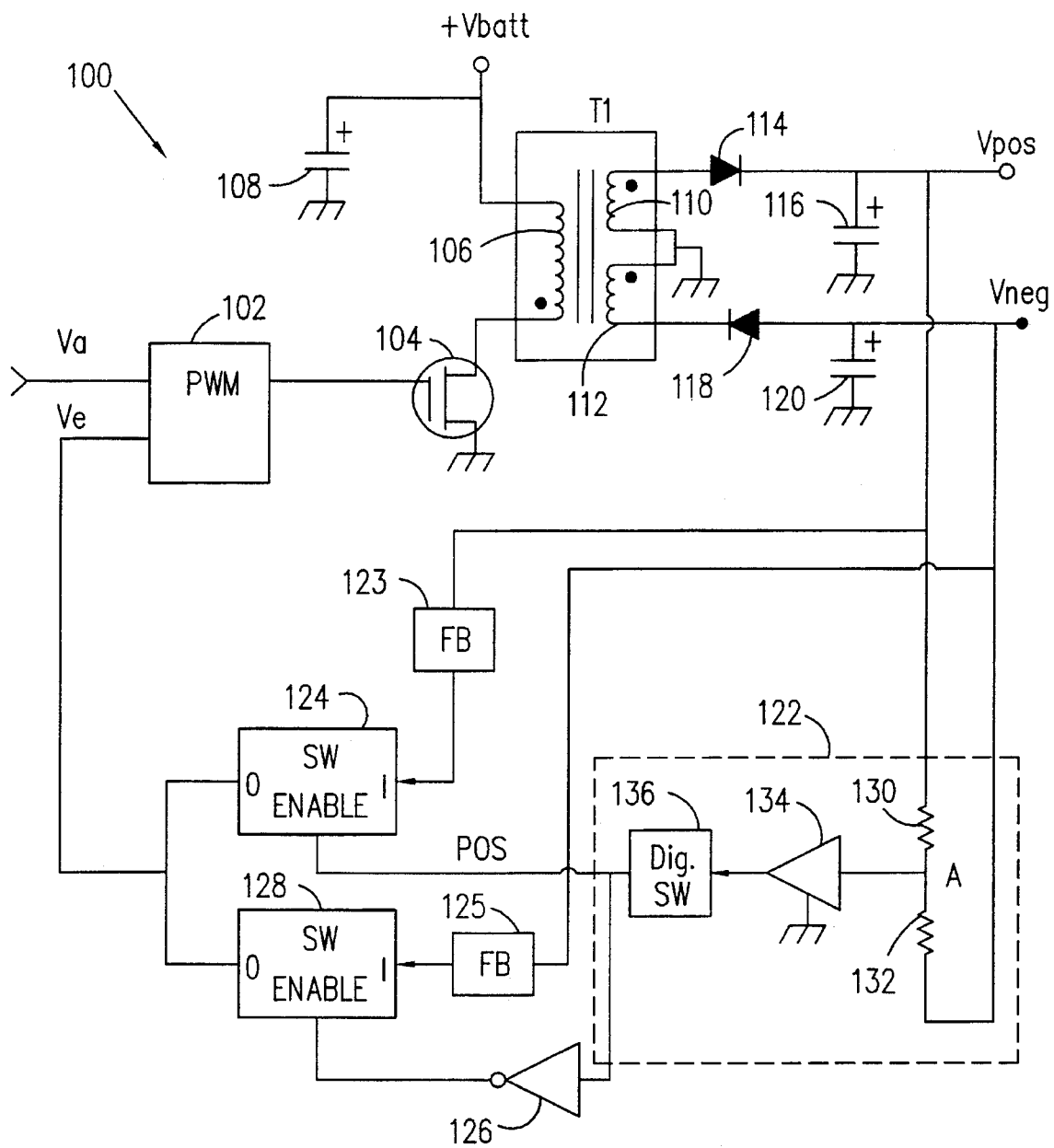
FIG. 1 is a schematic diagram of a dual output power supply according to the present invention.

Referring now to FIG. 1, a schematic diagram of a dual output flyback converter 100 is shown which is implemented according to the present invention. A pulse width modulation (PWM) circuit 102 receives a brightness adjust input voltage referred to as $V_A$ as well as an error voltage referred to $V_E$ and asserts a PWM type signal to the control terminal of a power switch 104. The power switch 104 is preferably an n-channel metal-oxide semiconductor field-effect transistor (MOSFET), although any other similar type switching device will suffice. The source of power switch 104 is connected to ground and its drain is connected to the dotted end of the primary inductor 106 of a transformer T1. The other end of the primary inductor 106 receives a source voltage $V_{BATT}$ from a battery or other DC power source, and a filter capacitor 108 is coupled between the $V_{BATT}$ signal and ground.

The transformer T1 includes a first secondary inductor 110 having its dotted end connected to the anode of a diode 114, which has its cathode providing the positive output of the converter 100, referred to as $V_{POS}$, which is filtered by a capacitor 116 connected between $V_{POS}$ and ground. The other end of the secondary inductor 110 is connected to ground and to the dotted end of another secondary inductor 112 of the transformer T1. The undotted end of the secondary inductor 112 is connected to cathode of a diode 118, having its anode providing the negative output voltage, referred to as $V_{NEG}$, which is filtered through a capacitor 120 coupled between $V_{NEG}$ and ground. The first and second secondary inductors 110, 112 of the transformer T1 preferably have equal turns for developing mirrored and opposite polarity output voltages.

The converter 100 is implemented in flyback fashion where the PWM 102 receives the $V_A$ and $V_E$ signals for developing a square wave type voltage having a controlled frequency or duty cycle for controlling the output voltage. The $V_A$ signal is set by the user and remains constant. The $V_E$ signal, however, is used to regulate the output voltage. The PWM signal turns on and off the power switch 104 for alternatively drawing current through the primary inductor 106 from the battery through the $V_{BATT}$ signal, which stores energy in the transformer T1. Current does not flow through the secondary inductors 110, 112 during this primary power conduction portion of the cycle because of the diodes 114 and 118. When the power switch 104 turns off, the transformer T1 experiences flux reversal allowing current flow through the diodes 114, 118, respectively, for developing the $V_{POS}$ and $V_{NEG}$ voltages.

According to the present invention, a detection circuit 122 receives both of the $V_{POS}$ and $V_{NEG}$ voltage signals and asserts a digital enable signal POS depending upon whether the $V_{POS}$ or $V_{NEG}$ signals are coupled to a load, such as a flat panel display for a portable computer. The $V_{POS}$ signal is provided to the input of a feedback circuit 123, which has its output connected to the input of an analog switch 124. The analog switch 124 receives the POS signal at its enable input, and has its output providing the $V_E$ signal as developed by the feedback circuit 123 if the POS signal is asserted high. If the POS signal is negated low, the analog switch 124 imposes a high impedance and thus disconnects the feedback circuit 123 from the $V_E$ signal. In particular, the analog switch 124 effectively couples its input to its output through a low impedance if POS is asserted, but otherwise imposes a very high impedance thus disconnecting its input form its output. The POS signal is provided to the input of an inverter 126, which has it output connected to the enable input of another analog switch 128. The analog switch 128 operates in a similar manner as the analog switch 123. The $V_{NEG}$ signal is provided to the input of another feedback circuit 125, having its output connected to the input of the analog switch 128. As compared to the feedback circuit 123, the feedback circuit 125 performs inversion to provide a positive output feedback voltage of equal amplitude. The analog switch 128 asserts the $V_E$ signal at its output as developed by the feedback circuit 125 if the POS signal is negated low, but otherwise couples a high impedance or disconnects its output. The analog switches 124, 128 are implemented in a similar manner and could comprise field-effect transistors or the like.

According to the present invention, the detection circuit 122 includes two balanced and relatively high impedance precision resistors 130, 132 have equal resistances coupled in series between the $V_{POS}$ and $V_{NEG}$ signals. The resistors 130, 132 have a relatively high impedance, such as 1 megohm (MΩ) each to prevent substantive loading of the a $V_{POS}$ and $V_{NEG}$ outputs of the converter. Also, the resistors 130, 132 have relatively tight tolerances, such as 1% each. The junction between the resistors 130, 132, referred to as node A, has a voltage level which is midway between the voltage levels of $V_{POS}$ and $V_{NEG}$. Thus, the resistors 130, 132 form a balanced voltage divider between the $V_{POS}$ and $V_{NEG}$ signals. It is noted that other types of balanced voltage dividers could be used for accurately sensing the midpoint voltage between $V_{POS}$ and $V_{NEG}$. Node A is connected to the input of a comparator circuit 134, which compares the voltage of node A relative to ground. It is noted that $V_{POS}$ and $V_{NEG}$ are referenced to ground since both secondary inductors 110, 112 are connected to ground. However, the common voltage could be any voltage level other than ground if an ungrounded, differential voltage is required. The output of the comparator circuit 134 is connected to the input of a digital switch 136, which asserts the POS signal at its output.

Operation of the flyback converter 100 is as follows. If a load, such as a flat panel display, is connected between the $V_{POS}$ signal and ground, the $V_{NEG}$ a signal tends to rise above its nominal level because of parasitic leakage inductance associated with the transformer T1. In particular, since current is not being drawn from the $V_{NET}$ signal, the magnitude of the voltage across the capacitor 120 rises causing $V_{NEG}$ to go more negative. Thus, the voltage at node A also shifts more negative, which is detected by the comparator circuit 134. The comparator circuit 134 and the digital switch 136 are configured to assert the POS signal high, which enables the analog switch 124 and disables the analog switch 128. In this manner, the $V_{POS}$ signal is regulated using the feedback circuit 123 to develop the $V_E$ signal, and the $V_{NEG}$ signal is disconnected from the feedback path.

In a similar manner, if a load is connected to the $V_{NEG}$ a signal, the $V_{POS}$ signal rises causing the voltage of node A to shift positive. The POS signal is negated low, thereby enabling the analog switch 128 and disabling the analog switch 124. In this manner, the $V_{NEG}$ signal is regulated using the feedback circuit 125 to develop the $V_E$ signal, and the $V_{POS}$ signal is disconnected from the feedback path.

Figure 2:
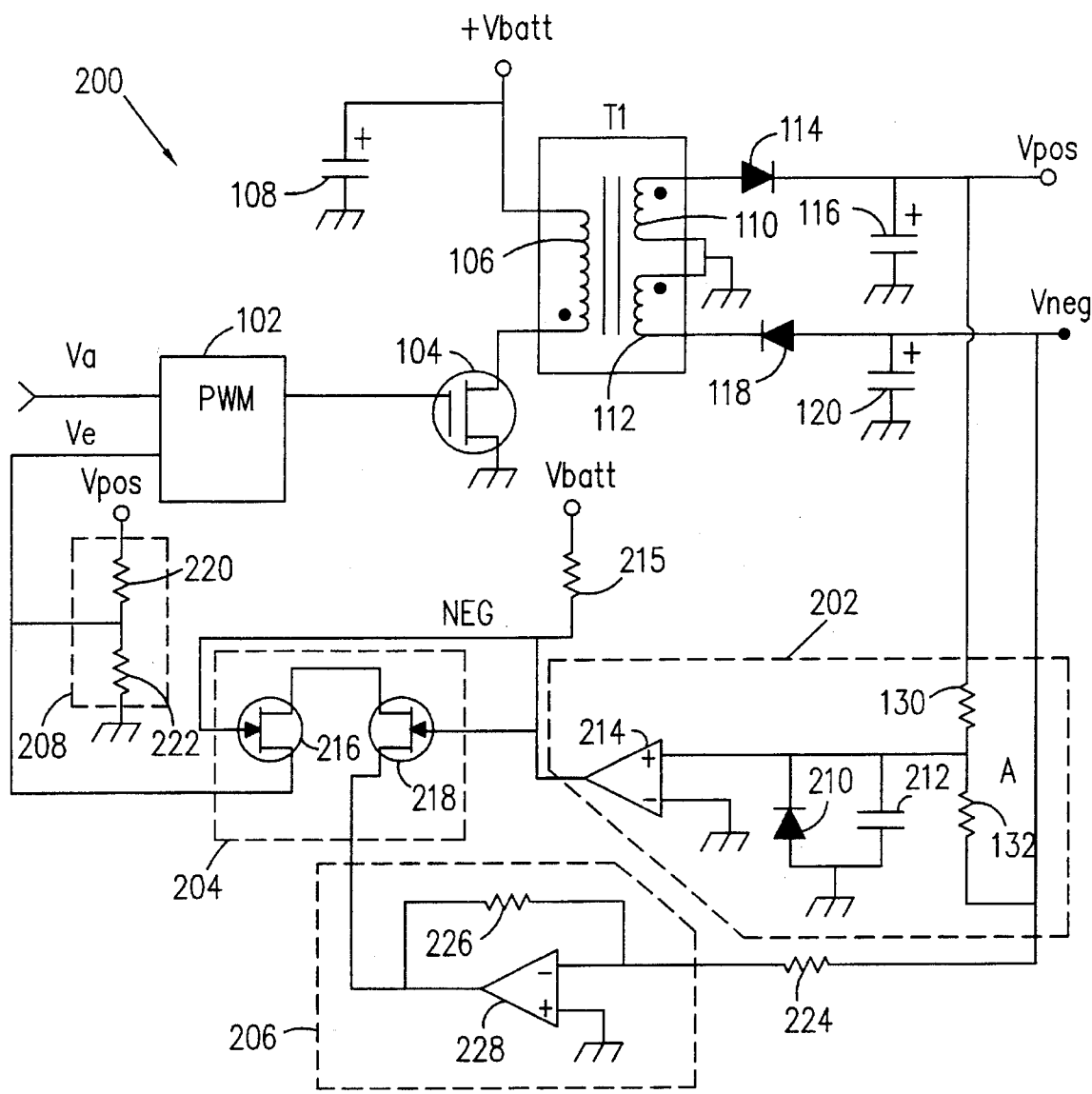
FIG. 2 is a schematic diagram of another dual output power supply according to the present invention.

Referring now to FIG. 2, a schematic diagram is shown of another flyback converter 200 implemented according to the present invention. Similar components assume identical reference numerals where the converter 200 is similar to the converter 100 and includes the PWM 102, the power switch 104, the transformer T1, the diodes 114, 118 and the capacitors 116, 120 for asserting the $V_{POS}$ and $V_{NEG}$ signals as previously described. However, the converter 200 includes a detection circuit 202 receiving the $V_{POS}$ and $V_{NEG}$ signals, and asserts a signal NEG to the enable input of an analog switch 204. The analog switch 204 has an input receiving the output of a negative feedback circuit 206, having its input receiving the $V_{NEG}$ signal. The output of the analog switch 204 is provided to the $V_E$ signal, which also receives the output of a positive feedback circuit 208, having its input receiving the $V_{POS}$ signal.

According to the present invention, the detection circuit 202 includes the high value precision resistors 130, 132 coupled in series between the $V_{POS}$ and $V_{NEG}$ signals as described before, having the same junction node A. Again, the resistors 130, 132 are 1 MΩ each with a precision of approximately 1%. Also, any other balanced, midpoint voltage divider having sufficient impedance could be used. Node A is provided to the cathode of a diode 210, to one end of a capacitor 212 and to the positive input of a comparator 214. The anode of the diode 210 and the other end of the capacitor 212 as well as the negative input of the comparator 214 are all connected to ground.

The detection circuit 202 operates in a similar manner as the detection circuit 122 without the digital switch 136. The output of the comparator 214 is provided to the gates of two FETs 216, 218 within the analog switch 204, where the FETs 216, 218 have their drains connected together. The output of the comparator 214 is also connected through a pullup resistor 215 to the VBATT signal, or any other available source rail voltage. The FETs 216, 218 are preferably 2N7002 type FETs or the like. The source of FET 216 is connected to the $V_E$ signal which is provided to the PWM 102 as previously described.

The $V_{POS}$ signal is provided to one end of a resistor 220 having its other end connected to one end of a resistor 222, which has its other end connected to ground. The junction of the resistors 220, 222 are coupled to the $V_E$ signal. In this manner, the resistors 220, 222 form the positive feedback circuit 208, which forms a voltage divider of the $V_{POS}$ signal to assert the $V_E$ signal for controlling the loop. The resistors 220, 222 are typically high value resistors for appropriately dividing the $V_{POS}$ signal to a voltage level sufficient for the $V_E$ signal, where the resistance values are preferably 20 KΩ and 10 KΩ, respectively. The $V_{NEG}$ signal is provided to one end of a resistor 224, having its other end connected to one end of a resistor 226 and to the negative input of an amplifier 228 which is connected as inverting voltage divider. The positive input of the amplifier 228 is connected to ground and its output is connected to the other end of the resistor 226 and to the source of the FET 218 within the analog switch 204. The resistors 224 and 226 are selected for appropriately dividing the magnitude of the $V_{NEG}$ signal appropriate for the $V_E$ signal, such as 30 KΩ and 10 KΩ, respectively. Also, the amplifier 228 serves to invert the voltage of $V_{NEG}$ to a positive voltage suitable for $V_E$. The output impedance of the amplifier is substantially lower than the parallel combination of the resistors 220, 222. This impedance is preferably about 15Ω.

Operation of the converter 200 is as follows and is similar to that described above for the converter 100. If a load such as a flat panel display is connected between the $V_{POS}$ signal and ground, the $V_{NEG}$ signal tends to develop a voltage magnitude greater than the $V_{POS}$ signal due to the parasitic inductance of the transformer T1 as described previously. Thus, the voltage at node A becomes more negative causing the comparator 214 to assert the NEG signal low thereby turning off the FETs 216, 218. This effectively removes the feedback circuit 206 from the circuit, so that the resistors 220, 222 of the positive feedback circuit 208 control the $V_E$ signal and thus control the loop. Thus, the $V_{POS}$ signal is regulated to the appropriate voltage as desired.

However, if a load is connected to the $V_{NEG}$ signal and not the $V_{POS}$ signal, then node A shifts to a positive voltage level and the comparator 214 asserts the NEG signal high thereby activating the FETs 216, 218. Since the output of the amplifier 228 has a relatively small impedance, typically about 15 ohms, the resistors 220, 222 are effectively removed from the circuit due to relatively high impedance as compared to the low output impedance of the amplifier 228. In this manner, the resistors 224, 226 and the amplifier 228 of the negative feedback circuit 206 control the loop and the $V_E$ signal. In this manner, the $V_{NEG}$ signal is regulated, while the positive output $V_{POS}$ is not.

In this manner, it is appreciated that a detection and switch circuit according to the present invention detects which output of a dual output flyback converter is coupled to a load and connects the appropriate feedback circuit to control the loop. The detection circuit comprises a balanced voltage divider coupled in series between the two opposite polarity outputs of the converter. A voltage shift of the midpoint junction of the voltage divider caused by transformer leakage inductance determines which output is loaded. A comparator detects the voltage shift and asserts its output accordingly to one or more analog switches. The analog switches couple the appropriate feedback circuit to complete the loop for regulating the voltage of the loaded output. The unloaded feedback path is effectively removed from the circuit. Thus, a relatively inexpensive flyback converter having dual outputs may be used while achieving the desired optimal load regulation figure of merit, regardless of which output is loaded. For example, a flat panel display having either a positive or negative voltage is coupled to the corresponding output of the converter, and its operating voltage is regulated within desired tolerances.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A feedback system for detecting and regulating the loaded output of a dual polarity output converter, the converter having a control circuit receiving an error signal for regulating positive and a negative output voltages relative to a common voltage level, said feedback system comprising:

a positive feedback circuit for coupling to the positive output voltage of the converter;

a negative feedback circuit for coupling to the negative output voltage of the converter;

a detection circuit, comprising:

a balanced voltage divider for coupling between the positive and negative output voltages of the converter, said voltage divider having a junction; and a comparator coupled to said voltage divider junction for detecting voltage shift relative to the common voltage level and for asserting a polarity signal indicative thereof; and a switch circuit coupled to said positive and negative feedback circuits and receiving said polarity signal, for switching control between said positive and negative feedback circuits for controlling the error signal.

2. The feedback circuit of claim 1, wherein said balanced voltage divider comprises two matched, high impedance resistors coupled in series between the positive and negative output voltages.

3. The feedback circuit of claim 2, wherein said resistors are each approximately 1 megohm.

4. The feedback circuit of claim 2, wherein said resistors are each precision resistors having a resistance within one percent of a nominal value.

5. The feedback circuit of claim 1, wherein the common voltage level is ground.

6. The feedback detection circuit of claim 5, wherein said comparator is referenced to ground.

7. The feedback circuit of claim 6, wherein said detection circuit further includes:

a digital switch coupled to said comparator for asserting a digital signal indicative of said voltage shift.

8. The feedback circuit of claim 7, wherein said switch circuit comprises:

a first analog switch having an input coupled to the positive feedback circuit, an enable input for receiving said digital signal and an output for controlling the error signal, wherein said first analog switch enables said positive feedback circuit to control the error signal if said digital signal indicates that the positive output voltage is loaded, but otherwise disconnects said positive feedback circuit; and a second analog switch having an input coupled to said negative feedback circuit, an enable input for receiving said digital signal and an output for controlling the error signal, wherein said second analog switch enables said negative feedback circuit to control the error signal if said digital signal indicates that the negative output voltage is loaded, but otherwise disconnects said negative feedback circuit.

9. The feedback circuit of claim 8, wherein said second analog switch further includes an inverter for inverting said digital signal.

10. The feedback circuit of claim 1, wherein said comparator compares the voltage at said voltage divider junction with the common voltage level.

11. The feedback circuit of claim 1, wherein:

said positive feedback circuit comprises a voltage divider coupled between the positive output voltage and ground and having a junction for providing the error signal;

said negative feedback circuit comprises a negative voltage divider including an amplifier asserting a feedback signal, wherein said amplifier has an output impedance substantially lower than the impedance of said positive feedback circuit; and said switch circuit comprises an analog switch having an input receiving said feedback signal, an enable input receiving said polarity signal and an output for controlling the error signal, wherein said analog switch couples said feedback signal of said negative feedback circuit as said error signal if said polarity signal indicates the negative output voltage is loaded, but otherwise disconnects said negative feedback circuit.

12. The feedback circuit of claim 11, wherein said analog switch includes a field-effect transistor.

13. The feedback circuit of claim 11, wherein said analog circuit comprises two field-effect transistors having their drains coupled together and their gates receiving said polarity signal, wherein the source of one field-effect transistor is coupled to the output of said amplifier of said negative feedback circuit and wherein the source of the other field-effect transistor is coupled to control the error signal.

14. A power converter having a positive and a negative output voltage for providing power to a device requiring either a positive or negative supply voltage, said power converter comprising:

a dual output flyback converter providing a positive and a negative output voltage relative to a common voltage level;

a balanced voltage divider coupled between said positive and negative output voltages of said converter, said voltage divider having a junction;

a comparator coupled to said junction of said voltage divider for detecting a voltage shift relative to said common voltage level and for asserting a polarity signal indicative thereof;

a positive feedback circuit receiving said positive output voltage for controlling said error signal;

a negative feedback circuit receiving said negative output voltage for controlling said error signal; and a switch circuit coupled to said positive and negative feedback circuits and receiving said polarity signal, wherein said switch circuit switches control of said error signal between said positive and negative feedback circuits for regulating said positive and negative output voltages, respectively, based on said polarity signal.

15. The power converter of claim 14, wherein said flyback converter comprises:

a control circuit receiving an error signal for asserting a pulse width modulation signal for regulating the output;

a transformer having a primary inductor and first and second matched secondary inductors;

means for supplying a DC source voltage coupled to said primary inductance of said transformer;

a power switch coupled to said primary inductor and receiving said pulse width modulation signal for switching current from said DC source voltage means through said primary inductor;

a first rectifier coupled to said first secondary inductor to implement flyback operation for developing said positive output voltage; and a second rectifier coupled to said second secondary inductor to implement flyback operation for developing said negative output voltage.

16. The power converter of claim 14, wherein said balanced voltage divider comprises two high impedance resistors coupled in series, each having approximately equal resistances.

17. The power converter of claim 14, wherein said common voltage level is ground and wherein said comparator compares the voltage of said junction of said voltage divider to ground.

18. The power converter of claim 14, wherein:

said positive feedback circuit comprises a voltage divider coupled between said positive output voltage and ground and having a junction for controlling said error signal; and said negative feedback circuit comprises a negative voltage divider including a inverting amplifier for asserting a feedback signal for controlling said error signal.

19. The power converter of claim 18, wherein the output of said inverting amplifier for asserting said feedback signal has a relatively low impedance compared to the resistance of said positive feedback circuit, and wherein said switch circuit comprises:

an analog switch having an input receiving said feedback signal, an enable input receiving said polarity signal and an output for controlling said error signal, wherein said analog switch couples said feedback signal as said error signal if said polarity signal indicates that said negative output voltage is coupled to the device, but otherwise disconnects said negative feedback circuit.

20. The power converter of claim 19, wherein said analog circuit includes at least one field-effect transistor having a gate receiving said polarity signal and a current path coupled between said negative feedback circuit and said flyback converter.

* * * * *